United States Patent Office 3,618,169
Patented Nov. 9, 1971

3,618,169
MANUFACTURE OF PLASTIC FILM
John B. Coast, Baton Rouge, La., assignor to Ethyl
Corporation, New York, N.Y.
Filed Nov. 12, 1969, Ser. No. 875,693
Int. Cl. B29d 7/04, 7/24
U.S. Cl. 18—14 A                        12 Claims

ABSTRACT OF THE DISCLOSURE

A molten plastic film is extruded through a circular die upward over a diffuser having a plurality of rows of omniradially directed orifices through which a gaseous coolant is directed against the interior of the extruded plastic tube. The gaseous coolant is directed along substantially the entire length of the molten portion of the extruded tube.

BACKGROUND OF THE INVENTION

Field of the invention

This invention relates to apparatus for producing tubular films from thermoplastic materials by extrusion processes. More particularly, the invention relates to novel tube forming and cooling apparatus whereby extrusion rates can be greatly increased.

Description of the prior art

It is well known in the prior art to extrude thermoplastic materials in molten condition through a circular die to form seamless tubing which is drawn from the die over wind-up or nip rolls, the tubing being inflated between the point of extrusion and the point of wind-up by means of a gaseous media such as air. Inflation of the tube thus formed causes a gaseous bubble to be confined within the tube between the extrusion die and the wind-up rolls. Such a method has become known as the "trapped bubble" process. The tube is commonly cooled by circulating air or other gaseous coolant within the interior of the tube or around the exterior of the tube.

Typical of the "trapped bubble" apparatus of the prior art used to cool the tube by circulating a gaseous coolant inside the tube is the device disclosed in U.S. Patent 3,329,999, issued to C. A. Cook. The Cook apparatus contains means for directing a stream of air or other gaseous coolant against the interior of the extruded film tube at the lower extremity of the tube. Additionally, air is directed against the exterior of the extruded tube near the lower extremity thereof.

In the trapped bubble process, the extruded tube leaves the die in a substantially molten state. The pressure of the trapped air bubble causes the molten portion of the tube to expand. At some point above the die, the tube cools sufficiently to freeze or solidify. The point at which the extruded tube freezes or solidifies is generally referred to as the "frost line." The molten portion of the film is thus the portion of the film between the frost line and the die. No further expansion of the film tube occurs above the frost line, and the diameter of the film tube above the frost line remains substantially constant.

At low extrusion rates the molten portion of the film tube is relatively small since the extruded film tube has more time to cool. Accordingly, the height of the frost line above the die is also very small. However, at high extrusion rates the frost line of the tube moves far above the die. At very high extrusion rates the frost line may reach a height above the die equal to more than twice the diameter of the die.

Some of the problems encountered in the high-rate extrusion of thermoplastic film by the trapped bubble process are distortion and rupture of the film tube in the molten area of the tube, and variation in thickness of the extruded film. As extrusion rates are increased, distortion and frequency of rupture increase. Distortion and fluttering is particularly severe in the area of the molten film upon which the gaseous coolant impinges, since the velocity of the streams of coolant must be increased to compensate for the increase in extrusion rates. Such fluttering and distortion cause large variations in the thickness of the extruded film. Severe bulges are common in the prior art at high extrusion rates in the area of the molten tube struck by the coolant stream, as is fluttering and rupture.

One of the principal types of distortion encountered in the high-rate extrusion of film in the devices of the prior art is the "necking in," or reduction in diameter, of the molten portion of the film tube which occurs in the portion of the film tube between the die and frost line. "Necking in" has been discovered to be caused by differences in pressure inside the molten portion of the film tube as a result of the venturi effect of the gaseous coolant flow inside the film tube.

SUMMARY OF THE INVENTION

In the development of the present invention, it was discovered that the disadvantages of the prior art film cooling devices are eliminated if the gaseous coolant used to cool the interior of the film tube is directed against substantially the entire length of the molten portion of the film tube rather than against a relatively small area of the molten portion as taught in the prior art.

It is an object of the present invention to provide a novel apparatus for the extrusion of tubular films by the trapped bubble process wherein gaseous coolant is directed outwardly against substantially the entire length of the molten portion of the extruded film tube.

It is another object of the invention to provide an apparatus for extruding film at high extrusion rates by the trapped bubble process whereby stability of the film tube is achieved.

It is a further object of the present invention to provide an apparatus for extruding tubular film at extremely high rates.

It is still a further object of the present invention to provide an apparatus for stabilizing the air bubble in the production of tubular film employing the trapped bubble process at very high extrusion rates.

It is still a further object of the present invention to provide an apparatus for varying the configuration of a trapped air bubble in an extruded tubular film without destroying the stability thereof.

The foregoing and additional objects of the present invention are realized in an apparatus for extruding a seamless tube of plastic material. The apparatus for extruding the film tube includes a generally circular die located beneath a diffuser. The diffuser provides a tubular body having a plurality of rows of orifices extending through the tubular body and located annularly around the tubular body at several levels along the length of the body. The orifices are adapted to deliver a gaseous coolant to the interior of the tube along substantially the entire length of the molten portion of the extruded film tube. A fan is located inside the diffuser to circulate the gaseous coolant over cooling coils also located in the diffuser. Means are provided to withdraw the tubular film from the circular die.

In the extrusion of a seamless film tube utilizing the apparatus of the present invention, a plastic resin is forced upward through a circular die to form a seamless film tube, and the tube is radially expanded over a trapped gas bubble. A plurality of streams of gaseous coolant are directed against the interior of the tube along substantially the entire length of the molten portion of the tube.

BRIEF DESCRIPTION OF THE DRAWINGS

Exemplary embodiments of the invention are shown in the accompanying drawings, in which.

DESCRIPTION OF THE PREFERRED EMBODIMENTS

Figure 1:
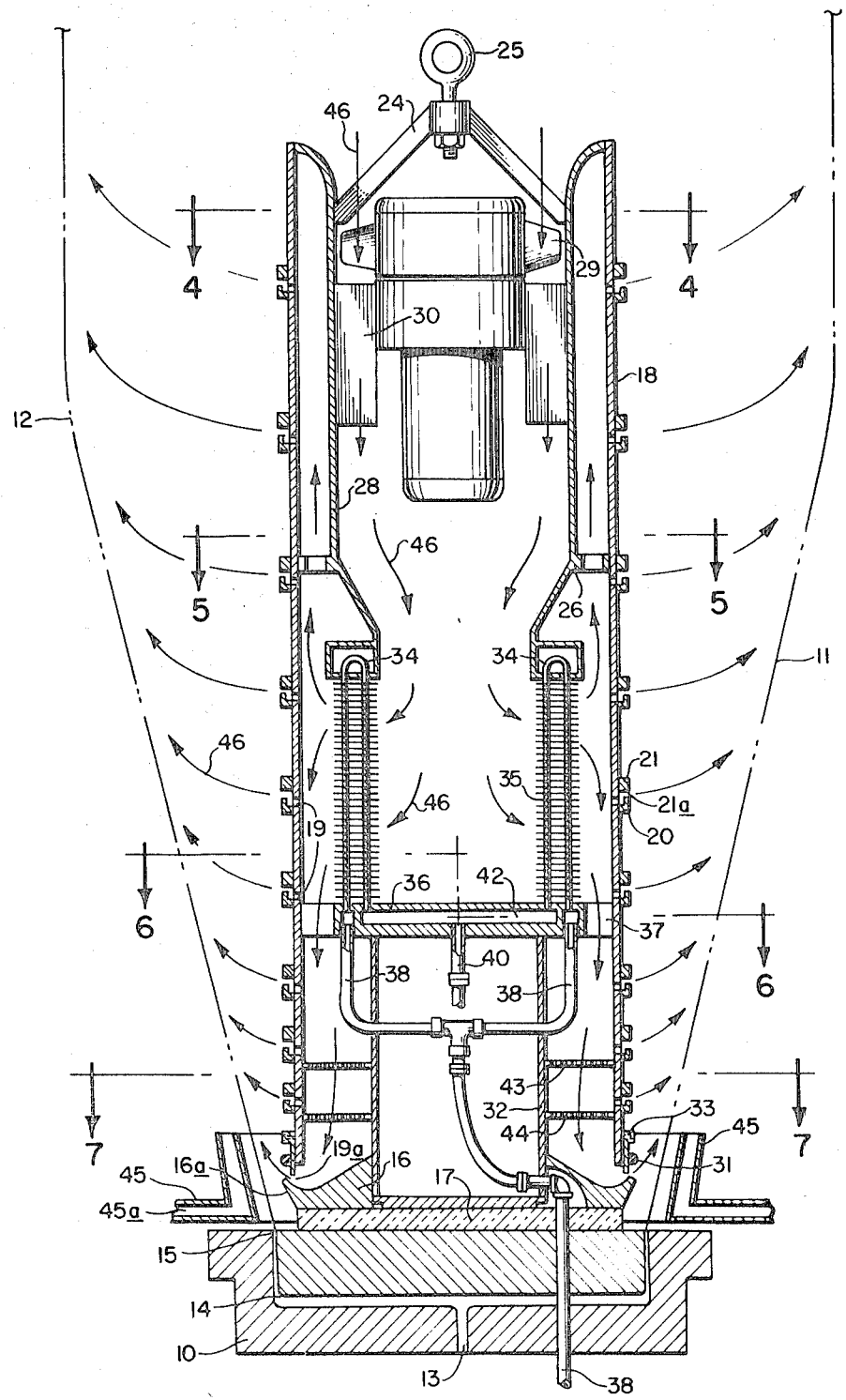
FIG. 1 is a vertical sectional view of the assembled diffuser and die.

Like reference characters are used to designate similar parts in the drawings and in the description of the invention which follows.

The essentials of the operation of the present invention are schematically shown in FIG. 1. A tube die 10 of any generally conventional or otherwise desirable variety is employed for extrusion. The die may be stationary, or rotatable, as disclosed in the Cook reference previously cited. The die 10 is fed through an inlet 13 connected to duct 14 with a fused or molten film-forming, resinous or polymeric composition such as polyethylene or polypropylene, or other suitable film-forming material. The molten resinous composition is provided under suitable pressure from a supply source (not shown), such as a fluid forwarding and metering pump or its equivalent, or an extruder or the like apparatus. The molten composition is extruded through the generally circular ring-like or annular orifice 15 of the tube die 10 to form the freshly extruded film tube 11 of the polymeric composition. Although in most cases it is satisfactory for the tube die 10 to have a circular or at least nearly circular orifice 15, it may also be suitably formed in oval, elliptical and other forms that are generally only circular in outline.

The freshly extruded plastic film tube 11 is oriented simultaneously with extrusion by a gas, such as air, which is trapped within the tube under sufficient pressure to cause stretching of the tube, and by gaseous coolant streams 46, which impinge upon the interior of the film tube 11. The film tube is usually expressed along an extrusion centerline that passes longitudinally through the center of the tube die and tubular body 18. The film tube, after being oriented by the distending gas bubble and by the coolant streams 46, is withdrawn from the die through a pair of suitable pinch or nip rolls (not shown), located above the "diffuser." The term "diffuser" is used to designate all of the apparatus above insulation 17 except duct 45. The compressive effect of the nip roll pairs utilized for flattening the film tube should be light enough to avoid any undesired crushing or fusion reaction on the freshly extruded tube.

Although the film can be extruded in any direction, it is generally advantageous, as indicated in FIG. 1, to have a vertically upward or vertically downward centerline of extrusion.

Figure 2:
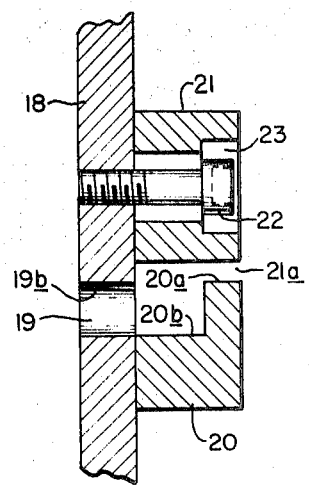
FIG. 2 is an enlarged sectional view of a typical row of coolant orifices.
Figure 3:
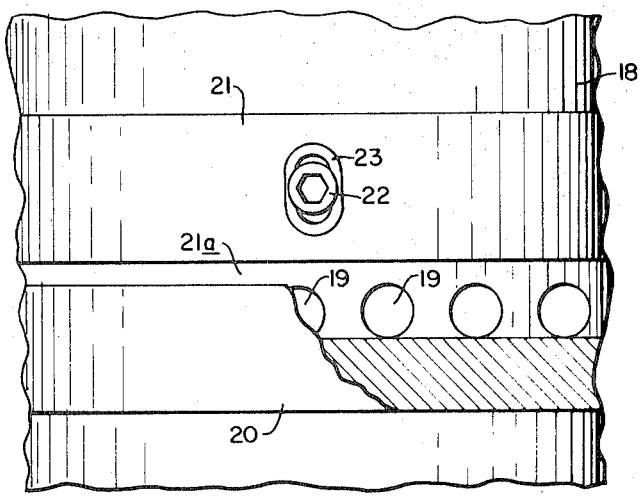
FIG. 3 is a partly sectional side view of FIG. 2.

The freshly extruded film tube 11, upon its emergence from the die and prior to or during its distension or stretching by the trapped bubble of gas, is cooled to a temperature beneath its thermoplastic temperature or point of fusion by means of omniradially directed inner-circumferentially impinging streams of air or other gaseous coolant fluid, indicated by the reference numerals 46. As can be seen in FIGS. 1–3, coolant streams 46 are directed against the inner surface of the film tube 11 by deflector 16, and rings 20 and 21. The cooling air, or other fluid, is forced outwardly through orifices 19 in tubular body 18 and through gap 19a by a fan 27. Fan 27 has blades 29 which force the gaseous coolant to flow downward in the tubular fan housing 28, as indicated by arrows 46, over cooling coils 34 and coling fins 35. The cooling coils 34 are supplied with "Freon" or some other suitable coolant from a source (not shown) outside the die 10 through supply hose 38 and return hose 40. After circulation and warming within the film tube, the air or other fluid is drawn downward into the top of diffuser 18 for recycling as indicated by air stream arrows 46 at the top of FIG. 1.

As can be seen in FIGS. 1–3, the tubular body 18 is generally cylindrical in shape and has a plurality of rows of orifices 19 located at several different levels along the length of the body. The number of rows of vents may vary, provided that the rows are located so that streams of coolant are directed against substantially the entire length of the molten portion of the tube, i.e., the area of tube 11 between frost line 12 and die orifice 15. Similarly, the longitudinal spacing of the rows of orifices 19 along the tubular body may vary.

Referring now to FIGS. 2 and 3, the orifices 19 are spaced radially in a row around the circumference of tubular body 18. In a preferred embodiment of the present invention, the vents are circular in shape and equidistantly spaced to insure maximum uniformity in air or gaseous coolant flow. However, the vents may be generally oval, or even polygonal in shape. The spacing of the individual orifices in a row also may be varied substantially.

Also illustrated in FIGS. 2 and 3 are stationary ring 20 and adjustable ring 21 located adjacent to orifice 19 on the outside of tubular body 18. Both rings are generally circular in shape. The two rings form coolant slot 21a through which air or other coolant entering orifice 19 must flow to impinge upon the inner surface of tube 11. The stationary ring 20 is fastened to the tubular body by any suitable means such as a weld or a screw. Adjustable ring 21 is fastened to tubular body 18 by means of a set screw 22 recessed into slot 23 in the ring. Screw 22 is threadably attached to tubular body 18 and may be loosened so that ring 21 may be moved upwardly or downwardly to change the width of coolant slot 21a.

Rings 20 and 21 were found to be helpful in securing a uniform flow of gaseous coolant through slot 21a. Without the two rings, the velocity of coolant flow from a row of orifices 19 would reach a maximum directly outward from each orifice which would be much higher than the minimum velocity reached half-way between each orifice. Such a variation in coolant velocity occurred even at considerable distances outward from the orifices. By locating stationary ring top 20a a distance above stationary ring bottom 20b approximately equal to the diameter of orifice 19, the gaseous coolant is prevented from flowing straight through orifice 19 unimpeded. As a result, the velocity of the gaseous coolant through slot 21a is very nearly uniform.

An annular gap or slot such as disclosed in the Cook reference, previously cited, may be substituted for the orifices 19 of the present invention. However, the orifices 19 are preferred because their employment simplifies the construction of a structurally strong tubular body 18.

Figure 4:
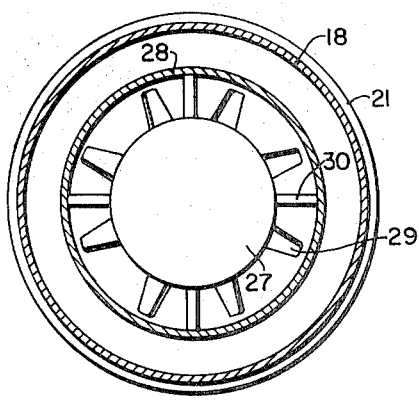
FIG. 4 is a partly sectional view of the diffuser taken along lines 4—4 of FIG. 1.

The fan 27 located within tubular fan housing 28 is attached to the fan housing by means of fan support 30. A top view of the fan is seen in FIG. 4 wherein housing 28 can be seen to be circular in shape and smaller in diameter than tubular body 18.

Figure 5:
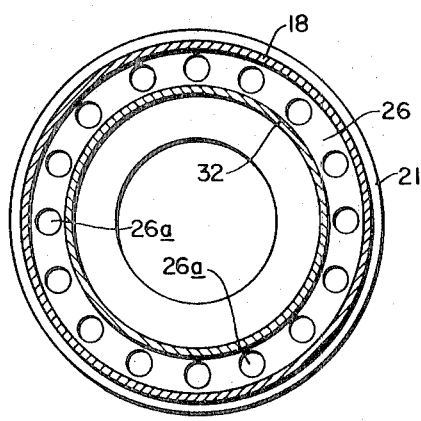
FIG. 5 is a partly sectional view of the diffuser taken along lines 5—5 of FIG. 1.

Tubular fan housing 28 is secured to the tubular body by top support 26. FIG. 5 shows a plan view of top support 26. As can be seen in FIG. 5, the support is generally circular in shape and contains a series of holes 26a which help maintain a uniform coolant flow to the rows of orifices 19 lying above support 26.

Figure 6:
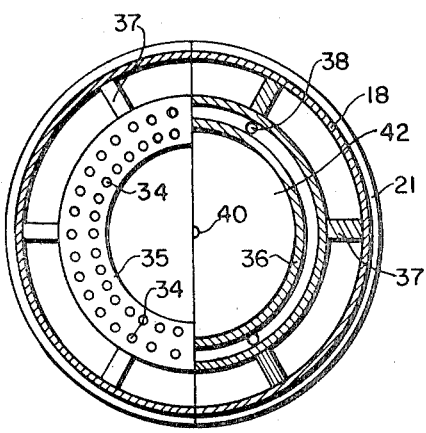
FIG. 6 is a partly sectional view of the diffuser taken along lines 6—6 of FIG. 1.

Cooling coils 34 are attached between the lower portion of tubular fan housing 28 and cooling coil base 36 as can be seen in FIG. 1. The cooling coils extend in a complete circle parallel to the interior of tubular housing 18, as can be seen in FIG. 6. Attached to the cooling coils are a series of fins 35 to expedite cooling of the air or other fluid circulated by the fan.

Cooling coil base 36 is attached to tubular body 18 by supports 37. The cooling coil base 36 is generally cylindrical in cross-section. The base contains a sump or chamber 42 into which the "Freon" or other suitable coolant undergoing circulation through cooling coils 34 flows. The base 36 also contains a coolant supply hose 38 which is connected to an outside source of coolant (not shown). The coolant flows into the sump 42 prior to return to the outside source of coolant (not shown).

Figure 7:
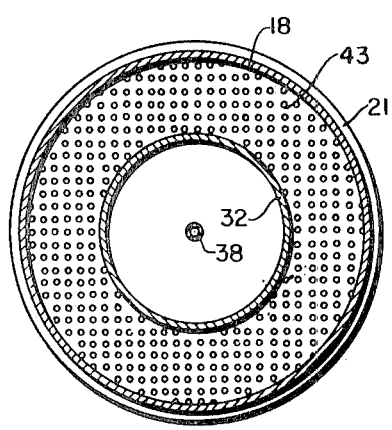
FIG. 7 is a partly sectional view of the diffuser taken along lines 7—7 of FIG. 1.

Base 36 is connected to deflector 16 by tubular support member 32. Tubular support member 32 is a hollow metal cylinder, a cross-section of which can be seen in FIG. 7. The lower end of support 32 is connected to air deflector ring 16 by a weld or other suitable means. Attached to tubular support member 32 are two baffles 43 and 44, one of which is shown in FIG. 7. Both baffles are identical, baffle 43 being located above baffle 44. The baffles contain a series of small holes to assure uniform flow through the orifices 19 and gap 19a located below the baffles.

Preferably, there is attached to the lower end of tubular body 18 an adjustable deflector ring support 33. Mounted on the support 33 is a gaseous coolant deflector ring 31. The support is slidably mounted on the lower end of body 18 so that the width of the air gap 19a may be varied by sliding the support 33 upward or downward on tubular body 18. Changing the position of the support causes a corresponding change in the direction and volume of the gaseous coolant flow from gap 19a. The ring 31 thus aids in controlling the direction of the flow through gap 19a.

The deflector 16 is generally circular in shape. The deflector contains a lip 16a on the top side thereof to aid in directing the air flow through gap 19a in the desired direction.

Located below deflector 16 is an insulating strip 17 which prevents the conduction of heat from die 10 upward into deflector 16. The strip may be composed of any common insulating material such as asbestos, for example.

Preferably, an outside air duct 45 is located outside of extruded film tube 11 and adjacent to deflector 16 as can be seen in FIG. 1. The venturi-type duct is generally circular and extends completely around the tubular body 18. Air or other like gaseous coolant supplied from a source not shown through passage 45a is blown out of duct 45 to cool the outside surface of the film tube 11.

Located at the top of tubular body 18 is an eye bolt 25 connected to a lift bracket 24 for use in lowering the diffuser into position over die 10. Bracket 24 is fastened by any suitable means to the tubular body.

While there has been described what are at present considered the preferred embodiments of the present invention, it will be apparent to those skilled in the art that various modifications and changes may be made without departing from the essence of the invention.

What is claimed is:
1. In an apparatus for forming an extruded tube of plastic material, the combination comprising:
 (A) A generally circular die adapted to extrude a seamless film tube;
 (B) A diffuser located on the extrusion side of said die and inside said film tube, said diffuser comprising:
  (i) A tubular body having a plurality of rows of orifices extending annularly around said body and longitudinally spaced along the length of said body, and a plurality of annular channels positioned on the outside of said body, overlying said rows of orifices and forming an annular slot which is adapted to direct a gaseous coolant omniradially from said tubular body to the interior of said film tube by preventing said gaseous coolant from flowing straight through the orifices unimpeded,
  (ii) A fan located inside said body to circulate said gaseous coolant, and
  (iii) Cooling means located inside said body to cool said gaseous coolant circulated by said fan; and
 (C) Means to draw said tubular film from said die.

2. The combination of claim 1 wherein said orifices are generally circular in shape and equidistantly spaced around said tubular body.

3. The combination of claim 2 wherein a generally circular coolant deflector means is located between said tubular body and said die and is axially aligned therewith to deflect a portion of said coolant against said interior of said film tube.

4. The combination of claim 3 wherein an adjustable ring means is located on said tubular body adjacent said coolant deflector means to vary the direction of said gaseous coolant flow from said coolant deflector.

5. The combination of claim 4 wherein a generally circular venturi-type throat is located immediately above said die and generally adjacent said diffuser, said throat being adapted to blow a gaseous coolant onto the exterior of said extruded tubular film.

6. The combination of claim 6 wherein said annular slots are adjustable to vary the flow of said gaseous coolant from said orifices to the interior of said film tube.

7. The combination of claim 6 wherein the row of said orifices most remote from said die is about as far from said die as the frost line of said extruded film tube.

8. The combination of claim 7 wherein said plastic is polyethylene.

9. In an apparatus for use in cooperation with a generally circular die to produce an extruded tube of plastic material, the combination comprising:
 a diffuser apparatus attached to and extending longitudinally outward from said die face within said tube of plastic material, said diffuser including a generally cylindrical, substantially solid wall, hollow body having a purality of longitudinally spaced-apart, annular slots in said wall, and a longitudinally movable deflector ring mounted on the end of said body adjacent said die; an annular deflector plate positioned between said die face and said movable deflector ring, said deflector plate having an upturned annular lip on its periphery facing said movable deflector ring and cooperating therewith to define a variable width annular orifice which permits changing the direction of flow of a gaseous coolant from said variable width orifice; a fan located inside said body to circulate a gaseous coolant through said body and out said orifice and said slots; and cooling means located inside said body to cool said gaseous coolant.

10. The combination of claim 9 including means for adjusting the width of said longitudinally spaced apart annular slots.

11. The combination of claim 10 wherein said means for adjusting the width of each of said longitudinally spaced apart annular slots includes a first annular band fixed to the outer wall of said hollow body and a second movable annular band attached to the outer wall of the said hollow body spaced from and adjacent to said first annular band.

12. The combination of claim 11 wherein said wall of said hollow body is provided with an annular row of orifices opening into the space provided between each set of said first and second bands.

References Cited

UNITED STATES PATENTS

| | | | |
|---|---|---|---|
| 1,601,686 | 9/1926 | Henderson | 264—95 X |
| 2,966,700 | 1/1961 | Dyer et al. | 264—95 |
| 3,064,905 | 11/1962 | Bonner | 18—14 S UX |
| 3,167,814 | 2/1965 | Corbett | 264—95 X |
| 3,274,315 | 9/1966 | Kawamura | 18—14 S UX |
| 3,329,999 | 7/1967 | Cook | 264—95 UX |
| 3,445,891 | 5/1969 | Thordarson | 18—14 S |
| 3,488,809 | 1/1970 | James | 18—14 S |

FOREIGN PATENTS

| | | | |
|---|---|---|---|
| 94,128 | 11/1963 | Great Britain | 264—95 |
| 1,104,079 | 2/1968 | Great Britain | 18—14 S |
| 1,423,754 | 11/1965 | France | 264—95 |

ROBERT F. WHITE, Primary Examiner

T. J. CARVIS, Assistant Examiner

U.S. Cl. X.R.

264—95; 18—14 S

PO-1050
(5/69)

UNITED STATES PATENT OFFICE
CERTIFICATE OF CORRECTION

Patent No. 3,618,169   Dated November 9, 1971

Inventor(s) John B. Coast

It is certified that error appears in the above-identified patent and that said Letters Patent are hereby corrected as shown below:

Column 4, line 18, reads "coling fins 35", should read -- cooling fins 35 --. Column 6, line 42, reads "Claim 6" should read -- Claim 5 --. Column 8, line 7, reads "94,128", should read -- 941,128 --.

Signed and sealed this 4th day of July 1972.

(SEAL)
Attest:

EDWARD M. FLETCHER, JR.
Attesting Officer

ROBERT GOTTSCHALK
Commissioner of Patents